(12) United States Patent
Sasaki

(10) Patent No.: US 9,556,845 B2
(45) Date of Patent: Jan. 31, 2017

(54) ENHANCED ENGINE PERFORMANCE WITH FUEL TEMPERATURE CONTROL

(71) Applicant: EcoMotors, Inc., Allen Park, MI (US)

(72) Inventor: Shizuo Sasaki, Camarillo, CA (US)

(73) Assignee: EcoMotors, Inc., Allen Park, MI (US)

( * ) Notice: Subject to any disclaimer, the term of this patent is extended or adjusted under 35 U.S.C. 154(b) by 344 days.

(21) Appl. No.: 14/206,792

(22) Filed: Mar. 12, 2014

(65) Prior Publication Data

US 2014/0303874 A1 Oct. 9, 2014

Related U.S. Application Data

(60) Provisional application No. 61/777,486, filed on Mar. 12, 2013, provisional application No. 61/777,755, filed on Mar. 12, 2013.

(51) Int. Cl.

| | |
|---|---|
| *F02M 31/00* | (2006.01) |
| *F02N 19/04* | (2010.01) |
| *F02D 41/06* | (2006.01) |
| *F02M 53/06* | (2006.01) |
| *F02D 19/06* | (2006.01) |
| *F02M 31/125* | (2006.01) |

(52) U.S. Cl.
CPC .............. *F02N 19/04* (2013.01); *F02D 41/064* (2013.01); *F02M 53/06* (2013.01); *F02D 19/0634* (2013.01); *F02D 19/0649* (2013.01); *F02D 2200/0612* (2013.01); *F02M 31/125* (2013.01); *Y02T 10/36* (2013.01)

(58) Field of Classification Search
CPC ........ F02M 31/00; F02M 31/02; F02M 31/12; F02M 31/125; F02M 53/06; F02M 19/0634; F02M 19/0636; F02M 19/0649; F02D 41/64; F02D 2200/0612; F02D 19/087; F02D 19/088; F02N 19/04
USPC .......... 123/543, 549, 557, 435; 701/101–115
See application file for complete search history.

(56) References Cited

U.S. PATENT DOCUMENTS

| 4,311,127 A | * | 1/1982 | Mayer | F02B 13/02 |
| | | | | 123/435 |
| 4,372,264 A | * | 2/1983 | Trucco | F02B 19/02 |
| | | | | 123/209 |
| 4,549,815 A | * | 10/1985 | Venkat | G01N 25/52 |
| | | | | 374/143 |
| 4,871,444 A | * | 10/1989 | Chen | C10G 29/205 |
| | | | | 208/46 |

(Continued)

*Primary Examiner* — Thomas Moulis
(74) *Attorney, Agent, or Firm* — Barnes & Thornburg LLP

(57) ABSTRACT

Methods and systems for utilizing heated fuel to compensate for a low cetane number, cetane number variance and sub-optimal engine cold-start performance in internal combustion engines are disclosed herein. Systems comprise a heater, a sensor, and an engine control unit ("ECU"). Methods can comprise detecting variables that affect combustion, calculating conditions inside a combustion chamber, determining the difference between current ignition delay and a desired ignition delay, estimating a cetane number of a fuel, and using the data to determine a suitable temperature that will compensate for cetane number and improve the ignition delay. Other methods comprise sending a signal to a heater in communication with a fuel injection system such that said heater warms fuel within the fuel injection system prior to injecting the fuel into a combustion chamber.

18 Claims, 4 Drawing Sheets

(56) References Cited

U.S. PATENT DOCUMENTS

| | | | | |
|---|---|---|---|---|
| 5,373,825 A * | 12/1994 | Stephens | F02M 31/125 | 123/525 |
| 6,006,720 A * | 12/1999 | Yanagihara | F02B 3/08 | 123/305 |
| 6,176,226 B1 * | 1/2001 | Nines | F02M 53/06 | 123/549 |
| 6,213,104 B1 * | 4/2001 | Ishikiriyama | F02B 51/00 | 123/27 GE |
| 6,390,076 B2 * | 5/2002 | Hunt | | 123/549 |
| 7,289,900 B2 * | 10/2007 | Wilharm | G01N 33/2829 | 123/435 |
| 7,401,591 B2 * | 7/2008 | Yamaguchi | F02D 35/023 | 123/299 |
| 7,444,230 B2 | 10/2008 | Cheiky | | |
| 7,546,826 B2 * | 6/2009 | Cheiky | F02M 27/02 | 123/297 |
| 7,657,363 B2 * | 2/2010 | Cheiky | G06F 17/30247 | 123/304 |
| 7,743,754 B2 * | 6/2010 | Cheiky | F02M 51/04 | 123/538 |
| 7,762,236 B2 * | 7/2010 | Frick | F02M 51/0603 | 123/472 |
| 7,926,331 B2 * | 4/2011 | Tsutsumi | F02D 41/0025 | 73/114.38 |
| 7,945,375 B2 | 5/2011 | Cheiky | | |
| 7,966,990 B2 | 6/2011 | Cheiky | | |
| 7,992,545 B2 | 8/2011 | Frick | | |
| 8,060,292 B2 * | 11/2011 | Takahashi | F02D 19/0684 | 123/1 A |
| 8,079,348 B2 | 12/2011 | Cheiky | | |
| 8,116,963 B2 | 2/2012 | Plambeck | | |
| 8,176,900 B2 | 5/2012 | Cheiky | | |
| 8,307,695 B2 * | 11/2012 | Miyaura | F02D 35/026 | 73/114.38 |
| 8,402,939 B2 * | 3/2013 | Reuss | F02D 35/023 | 123/299 |
| 8,423,267 B2 * | 4/2013 | Iwatani | F02D 41/401 | 123/406.3 |
| 8,511,287 B2 * | 8/2013 | Hofbauer | F02M 53/02 | 123/541 |
| 9,423,390 B2 * | 8/2016 | Tsuchiyama | F02D 19/061 | |
| 2002/0195086 A1 * | 12/2002 | Beck | B24B 3/003 | 123/435 |
| 2004/0016416 A1 * | 1/2004 | Ichihara | F02D 9/02 | 123/302 |
| 2004/0045533 A1 * | 3/2004 | Sukegawa | F02D 13/0226 | 123/478 |
| 2004/0231647 A1 * | 11/2004 | Mey | F02M 21/06 | 123/527 |
| 2007/0012290 A1 * | 1/2007 | Yamaguchi | F02D 35/023 | 123/406.47 |
| 2008/0060619 A1 * | 3/2008 | Allston | F02M 1/165 | 123/549 |
| 2008/0262699 A1 * | 10/2008 | Hasegawa | F02D 35/023 | 701/103 |
| 2009/0178651 A1 * | 7/2009 | Gale | F02D 41/0025 | 123/472 |
| 2009/0255499 A1 * | 10/2009 | Sasaki | F02B 23/0651 | 123/145 A |
| 2010/0094527 A1 * | 4/2010 | Futonagane | F02D 35/025 | 701/103 |
| 2010/0162805 A1 * | 7/2010 | Yoeda | F02D 35/028 | 73/114.63 |
| 2011/0057049 A1 * | 3/2011 | Hofbauer | F02M 53/02 | 239/5 |
| 2011/0088395 A1 * | 4/2011 | McNeil | C10L 1/026 | 60/616 |
| 2011/0100338 A1 * | 5/2011 | Vetrovec | F02M 53/06 | 123/557 |
| 2011/0209686 A1 * | 9/2011 | McCann | F02M 53/06 | 123/304 |
| 2011/0224886 A1 * | 9/2011 | Wang | F02D 19/08 | 701/103 |
| 2011/0265773 A1 * | 11/2011 | Xu | C10L 1/08 | 123/703 |
| 2012/0004826 A1 * | 1/2012 | Shimo | F02D 41/3035 | 701/103 |
| 2012/0145122 A1 * | 6/2012 | Kurtz | F02D 41/0025 | 123/299 |
| 2013/0080030 A1 * | 3/2013 | Chi | F02D 41/401 | 701/103 |
| 2013/0081592 A1 * | 4/2013 | Boer | F02M 53/02 | 123/299 |
| 2013/0192561 A1 * | 8/2013 | Hasegawa | F02D 41/04 | 123/435 |
| 2013/0220006 A1 * | 8/2013 | Ito | F02D 41/0025 | 73/114.51 |
| 2013/0306029 A1 * | 11/2013 | Stockner | F02M 21/0245 | 123/445 |
| 2013/0311063 A1 * | 11/2013 | Ito | F02D 41/1497 | 701/103 |
| 2013/0318946 A1 * | 12/2013 | Morris | C10L 1/003 | 60/273 |
| 2014/0156173 A1 * | 6/2014 | Hoda | F02D 41/0025 | 701/104 |
| 2014/0251278 A1 * | 9/2014 | de Boer | F02M 31/02 | 123/472 |
| 2014/0379242 A1 * | 12/2014 | Henein | F02D 35/021 | 701/104 |
| 2015/0211402 A1 * | 7/2015 | Yahata | F01N 3/206 | 422/105 |

\* cited by examiner

ENHANCED ENGINE PERFORMANCE WITH FUEL TEMPERATURE CONTROL

CROSS REFERENCE TO RELATED APPLICATIONS

This application claims the benefit of U.S. Provisional Application Ser. No. 61/777,486 to Shizuo Sasaki, entitled CETANE NUMBER COMPENSATION WITH FUEL TEMPERATURE CONTROL, filed on Mar. 12, 2013 and U.S. Provisional Application Ser. No. 61/777,755, to Shizuo Sasaki, entitled COLD START OF COMPRESSION-IGNITION ENGINE WITH HEATED FUEL INJECTION, also filed on Mar. 12, 2013. Both of these provisional applications are hereby incorporated herein in their entirety by reference, including the drawings, charts, schematics, diagrams and related written description.

BACKGROUND OF THE INVENTION

Field of the Invention

The present invention relates generally to the use of heated fuels in internal combustion engines, such as diesel engines, and specifically to novel methods and systems for compensating for conditions detrimental to optimal engine function, for example, chemical and physical characteristics of fuels which can affect combustion and cold start ignition.

Description of the Related Art

An internal combustion engine burning diesel fuel differs from standard internal combustion engines burning other liquid fuels (i.e. gasoline) or gaseous fuels such as propane or natural gas in that it utilizes a compression-ignition arrangement to ignite the diesel fuel while a spark plug is generally used to ignite a mixture of air and other fuel. Such a compression-ignition system primarily relies on the heat of compression to initiate ignition of the fuel that has been injected into the combustion chamber. However, diesel engines tend to exhaust a significant amount of particulates, various organic compounds and NOx. Furthermore, because an excess of air is usually present, a considerable amount of carbon dioxide ("$CO_2$") is produced which has undesirable regulatory and environmental implications.

Additionally, various physical properties and characteristics of the diesel fuel used in the above-mentioned engines can affect the efficiency of combustion in the compression-ignition arrangement. For example, compression-ignition can be affected by fuel density, lubricity, cold-flow properties, and sulfur content. One of the most significant characteristics affecting combustion efficiency is cetane number.

Cetane number is a measure of a fuel's ignition delay (i.e. the time period between the start of injection and the first identifiable pressure increase during combustion). A more simplified way of expressing this is that cetane number is a measure of how quickly a fuel starts to burn (auto-ignites) under compression-ignition conditions. Cetane itself (also known as Hexadecane) is an un-branched alkane hydrocarbon with the chemical formula $C_{16}H_{34}$; it has combustive properties and easily ignites under the pressure of diesel compression. Pure cetane has a cetane number of 100, while the fuel constituent alpha-methyl naphthalene has a cetane number of 0. All other hydrocarbons present in a particular diesel fuel are indexed to cetane as to how well they ignite under compression. Generally, fuels with a higher cetane number will have shorter ignition delay periods than lower cetane number fuels.

Cetane number is difficult to control and varies widely between different diesel fuels, or indeed even different batches of the same diesel fuel. For example, in the United States, cetane numbers for diesel fuels typically range from 38 to 53. Due to the inconsistencies regarding cetane number, methods have been developed to attempt to compensate for the cetane number in order to improve combustion efficiency.

One such method utilized to compensate for cetane number variance is to control injection timing. However, this method is not strictly reliable and produces unwanted side effects on both the chemical and physical process. Because cetane number affects the process of combustion and the mixture formation of the resulting by-products, when injection timing is controlled in attempt to compensate for cetane number variance. This control will also alter the overall balance of various combustion concerns, including noise, exhaust gas emissions, NOx, combustion stability, fuel consumption ratios, etc.

Another conventional method of reducing the above emissions, is through engine downsizing. However, downsizing strategies require an increased combustion efficiency with a boost in pressure to increase torque and power to maintain the performance level of a non-downsized engine. This is difficult as increased pressures are limited by structural design factors which result in a limited acceptable maximum cylinder pressure. Maintaining maximum cylinder pressure while downsizing engine components and simultaneously compensating for the downsized components with increased boost pressure requires lowering the compression ratio. However, maintaining a low compensation ratio results in a higher engine weight and sacrifices cold start performance of the vehicle, particularly when the engine block becomes cooled during cold weather.

Another attempted solution is to utilize glow assist such as the use of glowplugs. Glowplugs can produce high temperature conditions and improve ignitability of the fuel. Heat generated by the glowplugs is directed into the cylinders, and serves to warm the engine block immediately surrounding the cylinders, thus warming the air in the cylinders. Typical glow assist systems have a "wait to start" pre-heating cycle that utilizes internal sensors to detect when the engine block has reached a designated temperature, the glowplug relay then switches off a "wait-to-start" light. A pre-heating cycle usually lasts for 2 to 5 seconds. The operator of the vehicle then proceeds to activate the ignition and start the engine. The glowplug relay switches off the glowplugs after the engine is running. However, such a glow system does not always reduce the production of white smoke and other combustion particles in the exhaust.

Yet another attempted solution is to utilize a block heater to increase air intake temperature. However this significantly raises the cost of producing such an engine and requires additional components that will need to be replaced should they malfunction.

An efficient method and system for compensating for variance in cetane number, or lower cetane number, as well as improving cold start performance while reducing exhaust gas emissions without generating the typical various side effects above is therefore needed.

SUMMARY

Described herein are methods and systems for efficiently compensating for variance in cetane number, or lower cetane number, by utilizing a fuel heater and feedback analysis to control the temperature of a fuel. By heating the fuel the fuel is more receptive to compression-ignition despite having a variable cetane number while not excessively heating the fuel so as to cause the production of unwanted by-products. Methods according to the present disclosure comprise detecting one or more variables, calculating one or more conditions, estimating the cetane number of a utilized fuel and defining a suitable corrective temperature, measuring the temperature of the fuel and comparing the current and suitable fuel temperatures and providing feedback to a heater in communication with the fuel. Systems according to the present disclosure comprise a heater, a sensor, and an engine control unit ("ECU").

Also described herein are methods and systems for improving cold start performance of a compression-ignition engine while maintaining acceptable levels of exhaust gas emissions. Methods and systems according to the present disclosure comprise heating the fuel prior to the fuel entering the cylinder or combustion chamber to reduce cold start ignition time. Such methods and systems can further utilize a control unit, such as an engine control unit ("ECU"), which can control the heater and sensors for obtaining data to improve control of the heater and provide a feedback loop to further control the heater.

These and other further features and advantages of the invention would be apparent to those skilled in the art based on the following detailed description, taking together with the accompanying drawings, in which:

DETAILED DESCRIPTION

Figure 1:
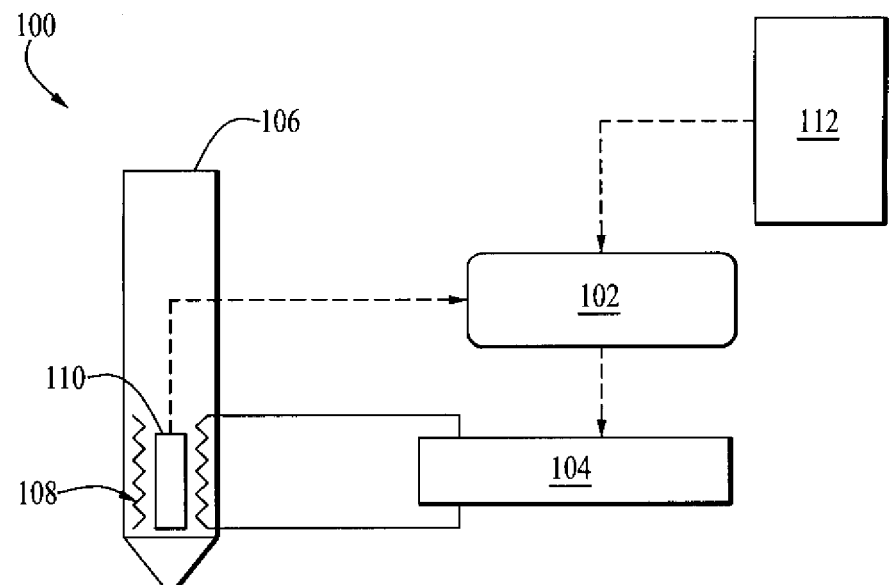
FIG. 1 is a schematic flow-diagram of a first embodiment incorporating features of the present invention.

The present disclosure is directed to methods and systems of improving engine performance through the use of heated fuel. Some methods and systems include compensating for cetane number variance in fuels utilized in diesel engines. Methods and systems according to the present disclosure can efficiently compensate for cetane number variance by measuring variables, performing calculations to determine a suitable fuel temperature to compensate for cetane variance and continually monitoring the fuel temperature.

Methods and systems incorporating features of the present disclosure can also improve cold start performance of a compression-ignition engine while maintaining acceptable levels of exhaust gas emissions. Methods and systems according to the present disclosure decrease ignition delay by heating the fuel directly rather than warming the cylinder or intake air as is a current technique. The fuel is heated prior to injection into the cylinder or combustion chamber. Since this method does not require altering the compression ratio or the use of glow assist or a block heater, exhaust gas emissions are not increased.

Throughout this disclosure, the preferred embodiments herein and examples illustrated are provided as exemplars, rather than as limitations on the scope of the present disclosure. As used herein, the terms "invention," "method," "system," "present method," "present system" or "present invention" refers to any one of the embodiments incorporating features of the invention described herein, and any equivalents. Furthermore, reference to various feature(s) of the "invention," "method," "system," "present method," "present system," or "present invention" throughout this document does not mean that all claimed embodiments or methods must include the referenced feature(s).

It is also understood that when an element or feature is referred to as being "on" or "adjacent" another element or feature, it can be directly on or adjacent the other element or feature or intervening elements or features that may also be present. Furthermore, relative terms such as "outer", "above", "lower", "below", and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention. As used herein, the term "and/or" includes any and all combinations of one or more of the associated list items.

The terminology used herein is for the purpose of describing particular embodiments only and is not intended to be limiting of the invention. As used herein, the singular forms "a," "an," and "the" are intended to include the plural forms as well, unless the context clearly indicates otherwise. For example, when the present specification refers to "a" heater, it is understood that this language encompasses a single heater or a plurality or array of heaters. It will be further understood that the terms "comprises," "comprising," "includes" and/or "including when used herein, specify the presence of stated features, integers, steps, operations, elements, and/or components, but do not preclude the presence or addition of one or more other features, integers, steps, operations, elements, components, and/or groups thereof.

In reference to the present application the term, "in communication with" can refer to being in electrical communication with (e.g. a power supply and heater), able to transmit and/or receive information from (e.g. a sensor and an ECU), or able to affect in a significant manner, (e.g. a heater in communication with fuel in a given location is able to affect the temperature of that fuel).

The present disclosure may use the term "combustion chamber" and "cylinder" interchangeably as in diesel engines, fuel is injected directly into the cylinder and ignited by compression.

It is understood that while the present disclosure makes reference to diesel engines and that diesel engines are the primarily known engine-type concerned with cetane number and compression-ignition conditions, methods incorporating features of the present invention can be utilized with any engine that has a compression-ignition component and/or step and/or that is concerned with the cetane number or other chemical or physical characteristic of the fuel that can be affected by temperature.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing.

FIG. 1 is a schematic flow-diagram incorporating features of one or more embodiments of the present invention, wherein broken or dashed lines indicate that the various components are in communication with one-another and report values or other signals accordingly. FIG. 1 depicts cetane compensation system 100. The compensation system 100 comprises an ECU 102, a power supply 104, a fuel injector 106, a heater 108 and at least one sensor 110.

A fuel injector 106 can be any fuel injector known in the art, particularly in use with a diesel engine. The fuel injector 106 can also be a fuel injector according to technology developed by the assignee of the present application, Transonic Combustion, Inc. Further examples of such fuel injection systems, including their drawings, schematics, diagrams and related written description, are set forth in, for example, U.S. Pat. No. 8,176,900; U.S. Pat. No. 8,116,963; U.S. Pat. No. 8,079,348; U.S. Pat. No. 7,992,545; U.S. Pat. No. 7,966,990; U.S. Pat. No. 7,945,375; U.S. Pat. No. 7,762,236; U.S. Pat. No. 7,743,754; U.S. Pat. No. 7,657,363; U.S. Pat. No. 7,546,826; and U.S. Pat. No. 7,444,230, which are incorporated herein in their entirety by reference.

The ECU 102 can be a standard engine control unit, which is known in the art, and can be further configured to receive the input 112. The Input 112 can comprise various variables, measurements and signals including, but not limited to, coolant temperature, intake temperature, engine speed, fueling command, airflow rate, exhaust gas recirculation ("EGR") rate, $O_2$ concentration, engine speed exhaust air-fuel ratio, cylinder pressure sensor signal and/or crank pulse signal. The input 112 to the system 100 can be obtained through sensors in communication with various other components in the engine system. The values obtained from the input 112 can be used by the ECU 102 to determine an ideal temperature for fuel in the injector 106 as is discussed below. The ECU 102 can also be configured to receive information from the sensor 110 and to control the power supply 104.

Sensor 110 is configured to detect and obtain values for at least one characteristic of the fuel within the fuel injector 106. In some embodiments the sensor 110 is a temperature sensor that detects the present temperature of the fuel within the fuel injector 106. The Sensor 110 is configured such that it can transmit values such as fuel temperature to the ECU 102.

The heater 108 is arranged so that it can modify the temperature of fuel within the fuel injector 106. In some embodiments, heater 108 is internal to fuel injector 106 (as shown). One advantage of arranging the heater 108 such that it is in communication with an individual fuel injector 106 rather than a fuel supply as a whole, is that the temperature can be individually regulated at the injector level, allowing one to introduce fuel of various temperatures to different areas of the combustion chamber. This allows for greater "fine-tuning" of combustion conditions.

The heater 108 can be any suitable heating element, for example a heating coil. In some embodiments the heater 108 is an electric heater in communication with the power supply 104. When the ECU 102 receives input from the sensor 110 relating to an undesirable fuel temperature, the ECU can switch the power supply 104 "on" or "off" to adjust the state of the heater 108, allowing the temperature of the fuel to be increased or decreased respectively. The heater 108 can, by default, be constantly "on" and only turned "off" when the current fuel temperature exceeds a set maximum or can, by default, be constantly "off" and only turned on when the current fuel temperature exceeds a set minimum.

It is understood that the above disclosed on/off switching of the power to the heater 108 does not only encompass embodiments wherein the power is "completely on" or "completely off," but also discloses a system where varying degrees of power can be applied to the heater 108 to provided additional control over the adjustment of the fuel temperature. For example, the power supply 104 can be controlled by the ECU 102 such that it lowers or raises the power to the heater 108 by a set amount that correlates to lowering or raising the temperature of the fuel within the fuel injector 106.

Figure 2:
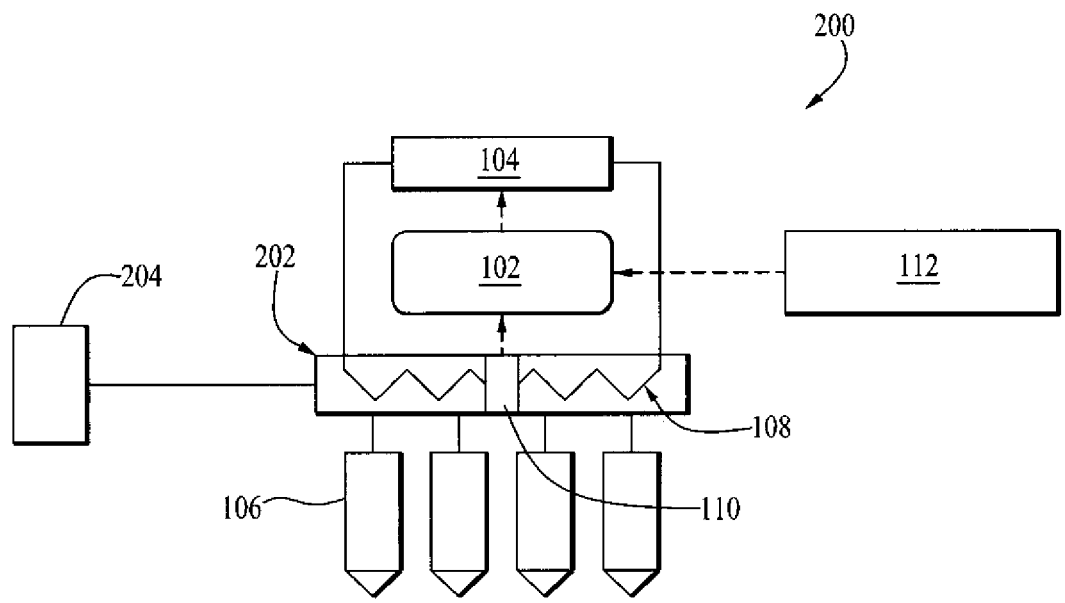
FIG. 2 is a schematic flow-diagram of a second embodiment incorporating features of the present invention.

It is understood that the basic system arrangement of FIG. 1 is one of several possible system arrangements according to the present disclosure. For example, FIG. 2 depicts a compensation system 200, similar to the compensation system 100, wherein like features share the same reference numbers. The compensation system 200 comprises an ECU 102, a power supply 104 at least one fuel injector 106, a heater 108, at least one sensor 110 and at least one fuel delivery pipe 202.

The compensation system 200 functions similarly to compensation system 100 above, including the ECU 102 receiving the input 112, the ECU being in communication with the heater 104 and the sensor 110. However, in FIG. 2, the heater 108 is not located internally to the fuel injector 106, but is instead arranged to affect the temperature of the fuel within the fuel delivery pipe 202. In some embodiments, the heater 108 is internal to the fuel delivery pipe 202 (as shown). The fuel delivery pipe 202 receives the fuel from the fuel tank 204 and provides the fuel to the fuel injectors 106. The compensation system 200 can be arranged such that all fuel injectors are in communication with a single fuel delivery pipe 202 or arranged such that there is a plurality of fuel delivery pipes receiving the fuel from the fuel tank 204, wherein each fuel delivery pipe 202 in the plurality of fuel pipes is in communication with one or more fuel injectors. One advantage of having one or more fuel injectors receiving fuel from a single fuel pipe is that the fuel temperature can be kept more consistent across the various injection sites in the internal combustion chamber.

Various methods can be utilized to compensate for cetane number variance. One of the advantages of such methods is that a particular fuel-injection system can be arranged to compensate for different fuels with varying cetane numbers. By heating the fuel while accounting for different variables and cetane number, a suitable fuel temperature can be determined that would result in optimal combustion. Ideally, the temperature should be high enough to further facilitate combustion, for example to compensate for lower cetane numbers, yet low enough so as not to produce negative by-products as discussed above, for example, to compensate for higher cetane numbers. Examples of such methods are discussed below.

Figure 3:
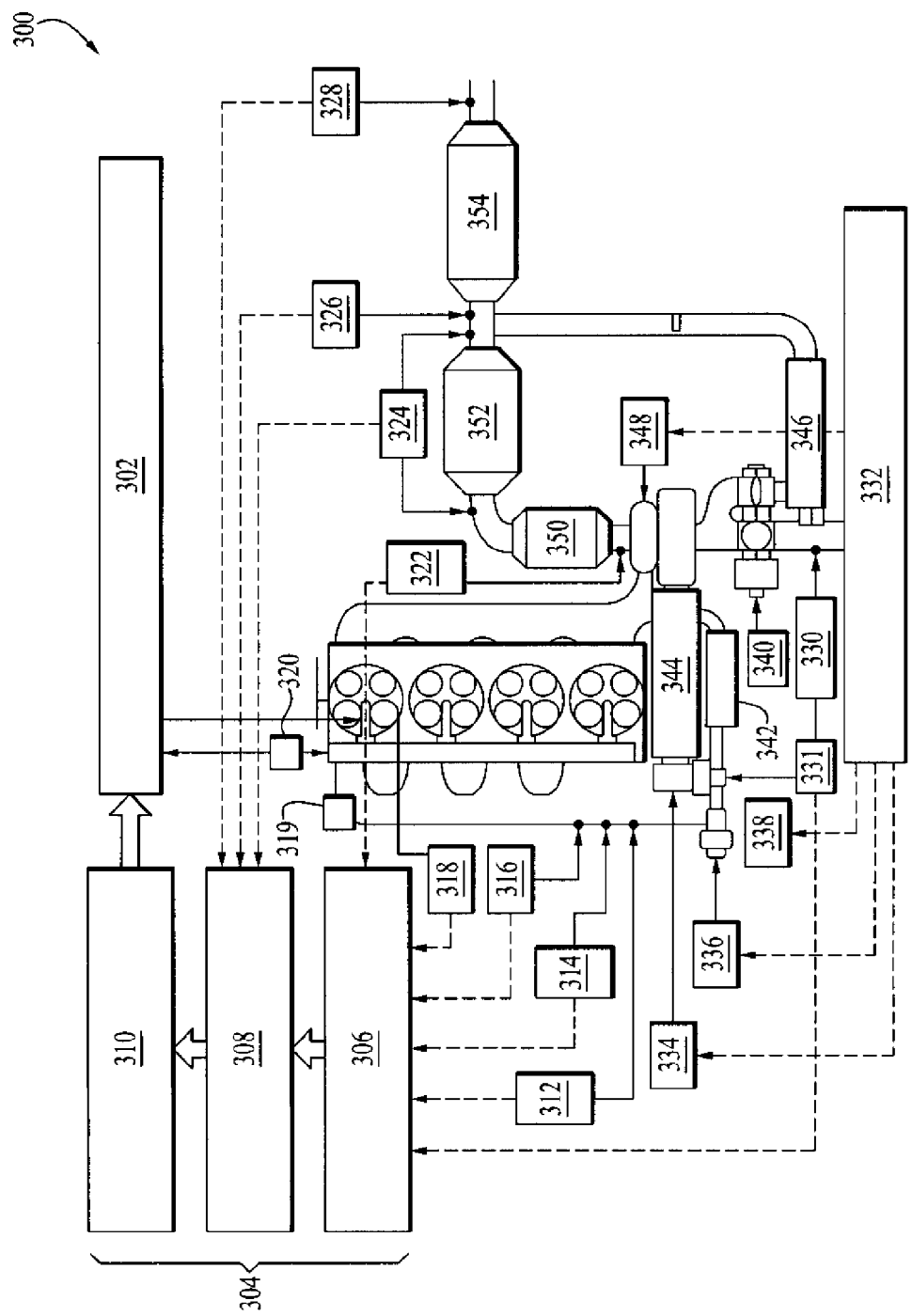
FIG. 3 is a schematic flow-diagram of one or more embodiments incorporating features of the present invention.

FIG. 3 is a schematic flow-diagram incorporating features of one or more embodiments and methods of the present invention. Broken or dashed lines indicate that the various components are in communication with one-another and report values or other signals accordingly. FIG. 3 illustrates application of an embodiment of a method 300, comprising a common rail system and heater arrangement 302 and a set of calculations and value determination steps 304. Calculation/determination steps 304 comprise in-cylinder condition calculations 306, ignition delay calculations 308 and determination of a fuel temperature control model 310 based on the calculations.

A first step in a method according to the present disclosure involves detecting certain variables. These variables can include various engine or fuel characteristics, including but not limited to engine speed, fueling command, airflow rate, exhaust air fuel ratio, EGR flow rate of $O_2$ concentration in the intake manifold (e.g. lambda), intake air and EGR temperature, coolant temperature, crank signal and cylinder pressure signal. Since delay in combustion of fuel and the resulting by-products takes into consideration temperature, cetane number and other variables listed above, coordinating a desired fuel temperature to compensate for variance in cetane number can lower the ignition delay and provide more control over the formation of by-products than the prior art proposed solution of injection timing control. It is understood that this first step can comprise detecting one or more of the above mentioned variables or any variable relevant to combustion. Depending on the particular fuel and engine used, some of the above variables may be more relevant than others.

Various sensors are utilized for the first step of detecting variables. FIG. 3 shows an example arrangement of the sensors and as such, other engine system components will be briefly mentioned and discussed so as to provide an example environment for arrangement of the various sensors. The sensors utilized in the embodiment shown in FIG. 3 include: a first $O_2$ sensor 312, a pressure sensor 314, a first temperature sensor 316, a cylinder pressure sensor 318, a rail pressure sensor 320, an exhaust gas oxygen sensor 322, a group of pressure change sensors 324, a second temperature sensor 326, a second $O_2$ sensor 328 and airflow sensors 330, 331.

The common rail system and heater arrangement 302 can further comprise an engine speed indicator 332 (such as an accelerator pedal), a throttle valve 334, a first EGR valve 336, a throttle 338, a second EGR valve 340, an EGR catalyst 342, an engine intercooler 344, an EGR cooler 346, an engine turbocharger 348, an engine diesel oxidation catalyst 350, an engine diesel particulate filter 352, and an engine lean $NO_x$ trap 354.

It is understood that not all of the sensors and/or engine components enumerated above are required to utilize methods according to the present disclosure. FIG. 3 simply provides an example environment wherein variable data can be collected according to the present method.

The first step involving the detection of variables can be performed at set intervals or during particular engine operating conditions, for example, when the engine is in idle. The ECU can perform the variable-detecting step automatically during these set intervals or the ECU can constantly monitor the variables and can switch power to the heater "on" or "off" when the variables reach certain values or combinations of values.

An example of a second method step utilizing the same embodiment of FIG. 3 is calculating in-cylinder (or in-combustion chamber) conditions as depicted in step 306. Such calculations utilize data obtained from several sensors 312, 314, 316, 318, 322, 331. This data relates to the conditions inside the combustion chamber that can affect combustion, and when considered together, provide an overview of variables to be accounted for when determining values according to the further method steps below. This data is then subject to calculations that determine the effect of the conditions on combustion and/or the production of undesirable by-products. The effect of the collected variables on combustion and the production of by-products is known in the art and can be calculated by one of ordinary skill in the art.

A third method utilizing the same embodiment of FIG. 3 is to calculate ignition delay as step 308. Such calculations utilize data obtained from the pressure sensors 324, second temperature sensor 326, the second $O_2$ sensor 328, cylinder pressure sensor 318, and/or the crank signal sensors 319. Of note is that the cylinder pressure sensor 318 can directly detect ignition delay and that the crank signal sensor 319 can detect angular displacement and can therefore detect knocking and misfire to help estimate cetane number. The data allows one to calculate actual ignition delay (i.e. the time period between the start of injection and the first identifiable pressure increase during combustion). Calculation of ignition delay is known in the art. The actual ignition delay value is then compared with a set of determined ideal or desired ignition delay values.

Utilizing the same embodiment of FIG. 3, a fourth method is to estimate the cetane number of the fuel and determining a suitable fuel temperature to compensate for the cetane number as step 310. The values determined in the in-cylinder condition calculation step 306 and the difference between actual and desired ignition delay determined in the ignition delay calculation step 308 are used with the estimated cetane value to determine a suitable fuel temperature to achieve the desired ignition delay and compensate for any cetane number variance. By considering the effect that cetane number and the values determined in the in-cylinder condition calculation step 306 have on combustion, one can calculate the necessary temperature change to reach the desired ignition delay. The cetane number of the fuel can be estimated using techniques known in the art and certain engine operating conditions can be controlled to provide a better estimate. For example, at idling or steady speed conditions, by removing EGR, injection timing of a particular cylinder can be slowed just prior to misfire, allowing the cetane number to be measured more easily.

It is understood that the above methods can be used to determine a necessary fuel temperature change required to reach a desired ignition delay value in order to compensate for a lower cetane number or cetane number variance. By adding the further method steps below, the method can be implemented to actually change and/or monitor the temperature of the fuel.

An example of a fifth method step utilizing the same embodiment of FIG. 3 is to measure the existing fuel temperature within the cylinder or combustion chamber. This can be accomplished through use of temperature sensors as discussed above in reference to FIGS. 1 and 2.

An example of a sixth method step utilizing the same embodiment of FIG. 3 involves comparing the suitable temperature determined in the last step 310 with the existing temperature measured as set forth above. Feedback is provided to a power supply 104 in communication with a heater 108 as discussed above in FIGS. 1 and 2 or directly to the heater 108. The feedback signal provided to the power supply 104 and/or heater 108 will switch the heater "on" or "off" or otherwise change the intensity of the heater so that the current temperature of the fuel approaches the selected suitable temperature established above from step 310 and is maintained around the suitable temperature.

Figure 4:
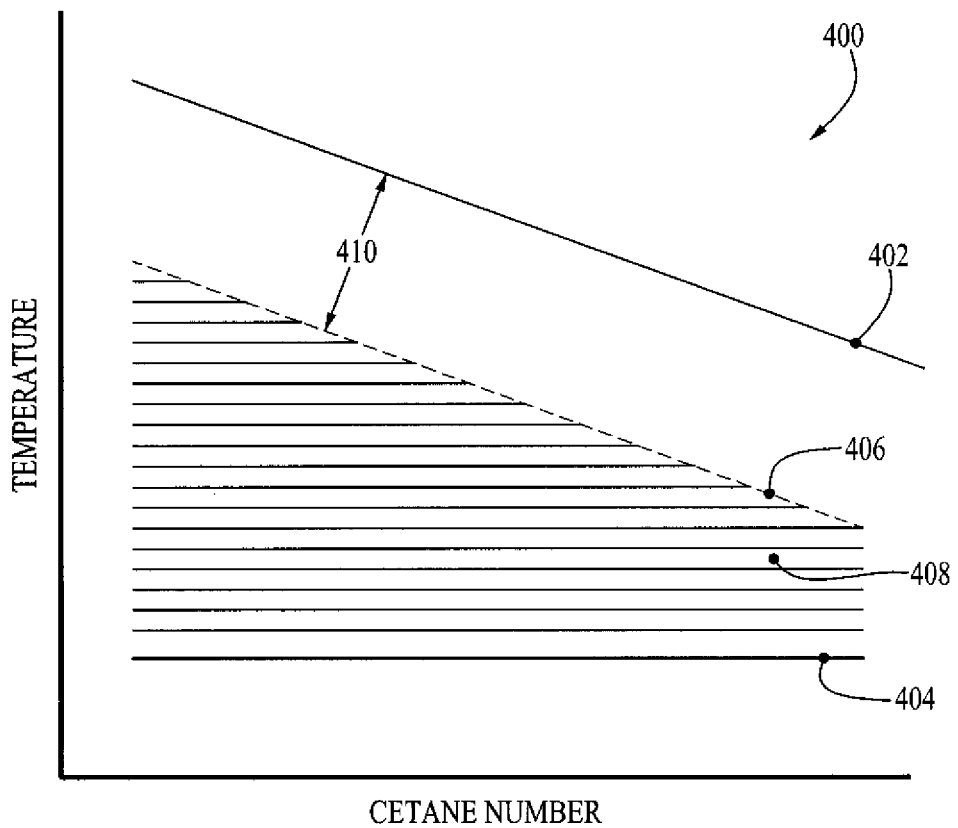
FIG. 4 is a graph demonstrating the effect of temperature compensation on combustion relating to one or more embodiments of the present invention.

FIG. 4 is graph 400 illustrating the relational effect of temperature compensating for cetane number on combustion. The graph 400 shows an ignition temperature 402. Decreasing as cetane number increases. The graph 400 also shows an existing combustion chamber temperature 404, which represents the temperature of the combustion chamber prior to injection of the fuel.

With continued reference to FIG. 4, in order to compensate for cetane number variance, the existing temperature 404 is increased to a certain threshold temperature 406, where the threshold temperature 406 relates to the ignition temperature 402 such that the threshold temperature will reach the ignition temperature due to the effect of pressure from cylinder compression. The necessary amount 408 the existing temperature must be increased to reach the threshold temperature 406 is represented in the graph 400 as the area between the threshold temperature 406 and the existing temperature 404. The compression-temperature effect of the cylinder 410 is represented in the graph 400 by the distance between the ignition temperature 402 and the threshold temperature 406.

It is understood that while the ignition and threshold temperatures are depicted in FIG. 4 as straight lines, the lines may be curved or represent an exponential variance rather than a linear one. This is because as cetane number increases, the required ignition temperature can decrease at an increasing rate. Furthermore, it is understood that the additional variable factors mentioned above can also effect the general concept expressed in FIG. 4, further altering necessary ignition temperature.

Figure 5:
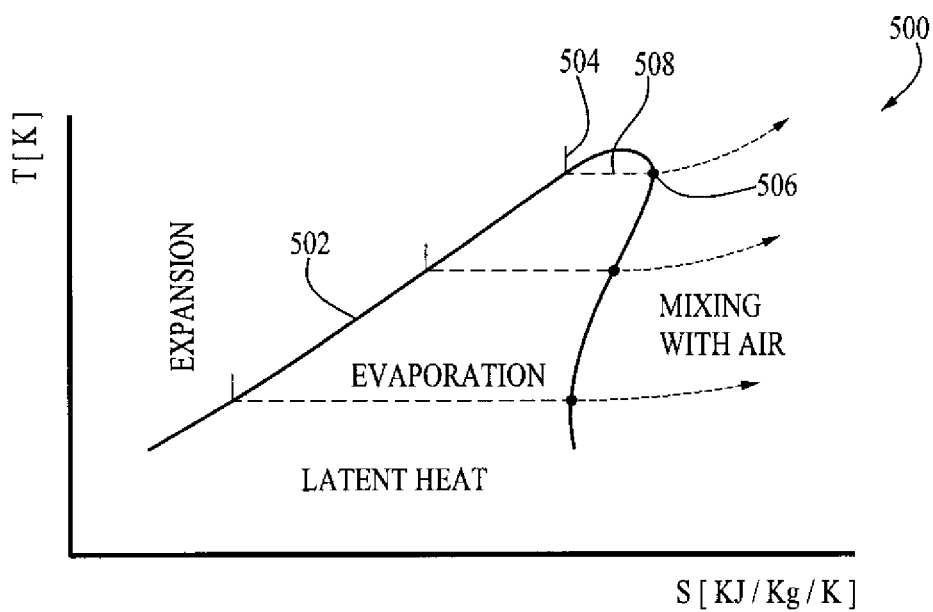
FIG. 5 is a graph demonstrating the effect of fuel temperature on ignition delay.

The fuel temperature control systems and methods set forth in this disclosure can also be utilized to improve cold start engine performance along with, or independent of, cetane number. FIG. 5 is a graph 500, demonstrating the effect of adjusting the fuel temperature on combustion and thus cold start efficiency. FIG. 5 shows a standard saturation line plotted on a graph 500 of temperature (in K) versus entropy in [kJ/kg/K]. The line 502 shows a liquid and vapor saturation line. As shown in FIG. 5, fuel temperature is constant through the point of evaporation and subsequently increases during the mixing with in-cylinder air (represented by the downward sloping portion of the line 502). On the increasing portion of the line 502, which represents raising fuel temperature utilizing methods according to the present disclosure, are hash marks 504 which correspond to points 506 on the downward sloping portions of the line 502. The distance 508 between the hash marks 504 and the corresponding points 506, demonstrates that as the phase changes from liquid to vapor, less latent heat is needed to bring the liquid fuel to the point of combustion.

During an engine cold start, virtual or estimated cetane number is typically lower than the cetane number of the fuel. Virtual cetane number can be determined as discussed above as the function of a variety of operating conditions including but not limited to: fuel temperature, coolant temperature, intake temperature, and ambient pressure. In some embodiments, this virtual cetane number can be calculated before the first injection at cold start conditions. The temperature of the fuel can then be controlled, for example, heated, to improve cold start performance based on the calculated virtual cetane number.

One issue to consider when designing a system to employ a cetane number compensation method according to the present disclosure is that coking can be prevented by controlling the temperature of the fuel so that it remains in liquid phase while in the nozzle of a fuel injector. This can be easily achieved, for example, in embodiments wherein a heater is located in the fuel injector itself.

I claim:

1. A method for compensating for cetane number of a fuel and improving ignition delay in an internal combustion engine, comprising:

detecting, with an engine control unit (ECU), operating conditions within the internal combustion engine that affect ignition delay;

calculating, with the ECU, an effect of variations in the detected operating conditions or ignition delay inside a combustion chamber of the internal combustion engine;

based on the detected operating conditions, calculating, with the ECU, a current ignition delay and determining, with the ECU, a desired ignition delay for the internal combustion engine;

estimating, with the ECU, a cetane number of the fuel within the combustion chamber based on at least one of the detected operating conditions and determining, with the ECU, a preferred fuel temperature that, when taken in combination with the estimated cetane number and the calculated effect of the variations in operating conditions, produce the desired ignition delay;

measuring the temperature of the fuel in the combustion chamber; and comparing, with the ECU, the measured temperature of fuel with the preferred fuel temperature and changing the temperature of the fuel provided to the combustion chamber such that it approaches the preferred fuel temperature.

2. The method of claim 1, wherein the operating conditions comprise one or more of: engine coolant temperature, intake air temperature, engine speed, intake airflow rate, exhaust gas recirculation rate, intake oxygen concentration, the ratio of air to fuel, cylinder pressure, and crank angle displacement.

3. The method of claim 1, wherein one of the operating conditions comprises coolant temperature.

4. The method of claim 1, wherein one of the operating conditions comprises intake temperature.

5. The method of claim 1, wherein one of the operating conditions comprises engine speed.

6. The method of claim 1, wherein one of the operating conditions comprises intake airflow rate.

7. The method of claim 1, wherein one of the operating conditions comprises exhaust gas recirculation rate.

8. The method of claim 1, wherein one of the operating conditions comprises oxygen ($O_2$) concentration.

9. The method of claim 1, wherein one of the operating conditions comprises the ratio of air to fuel.

10. The method of claim 1, wherein one of the operating conditions comprises cylinder pressure.

11. The method of claim 1, wherein one of the operating conditions comprises crank angle displacement.

12. The method of claim 1, further comprising:

injecting fuel, with a fuel injector, into the combustion chamber;

placing a heater in communication with the fuel injector; and changing the temperature of the fuel provided to the combustion chamber by sending a signal, with the ECU, to the heater to produce heat to increase the temperature of the fuel within the fuel injector prior to injecting the fuel into the combustion chamber.

13. The method of claim 1, further comprising:

injecting fuel, with a fuel injector, from a fuel delivery chamber in communication with the fuel injector into the combustion chamber;

placing a heater in communication with the fuel delivery chamber; and changing the temperature of the fuel provided to the combustion chamber by sending a signal, with the ECU, to the heater to produce heat to increase the temperature of the fuel within the fuel delivery chamber prior to injecting the fuel with the fuel injector into the combustion chamber.

14. A system for improving the performance of a compression-ignition engine, comprising:
 a fuel injector for injecting a fuel into a combustion chamber of the compression ignition engine;
 a heater for heating the fuel;
 at least one sensor configured to detect at least one operating condition affecting ignition delay within a combustion chamber of the engine; and
 an engine control unit (ECU) to calculate an effect of variations in the at least one operating condition on the ignition delay, to calculate a current ignition delay based on the at least one operating condition, to determine a desired ignition delay, to estimate a cetane number of the fuel within the combustion chamber based on the at least one operating condition, to determine a preferred fuel temperature which, when taken in combination with the estimated cetane number and the calculated effect of the variations in the at least one operating condition on the ignition delay, produce the desired ignition delay, and to control the heater to adjust the temperature of the fuel such that it approaches the preferred fuel temperature prior to injection of the fuel into the combustion chamber of the compression ignition engine.

15. The system of claim 14, wherein the heater is located within the fuel injector.

16. The system of claim 14, further comprising a fuel delivery chamber in communication with the fuel injector, wherein the fuel injector injects fuel from the fuel delivery chamber into the engine, and wherein the heater is located within the fuel delivery chamber.

17. The system of claim 14, wherein the at least one sensor is configured to detect one or more of: engine coolant temperature, air intake temperature, engine speed, intake airflow rate, exhaust gas recirculation rate, oxygen concentration rate, the ratio of air to fuel, cylinder pressure, and crank angle displacement.

18. A method for improving the cold start performance of a compression-ignition engine having a combustion chamber, comprising:
 injecting fuel into the combustion chamber;
 detecting at least one of coolant temperature and intake pressure of the engine;
 calculating, with an engine control unit (ECU), a virtual cetane number of the fuel injected into the combustion chamber based on the detected at least one of coolant temperature and intake pressure of the engine;
 determining, with the ECU, a preferred fuel temperature based on the calculated virtual cetane number; and
 controlling, with the ECU, a heater to heat the fuel to the preferred fuel temperature prior to injecting the fuel into the combustion chamber.

* * * * *